Dec. 19, 1967  J. W. SANDERSON  3,358,742
SECURING DEVICES
Filed March 1, 1965  2 Sheets-Sheet 1
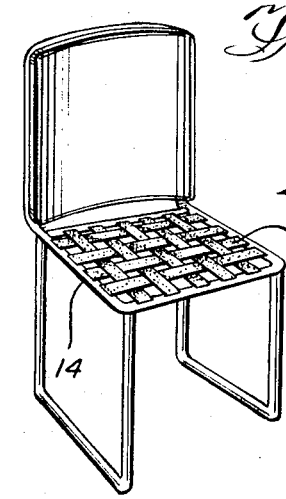
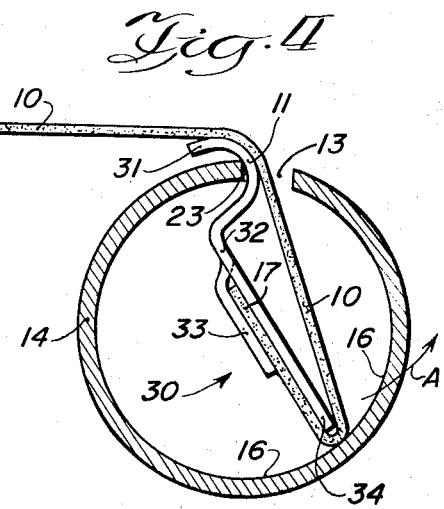
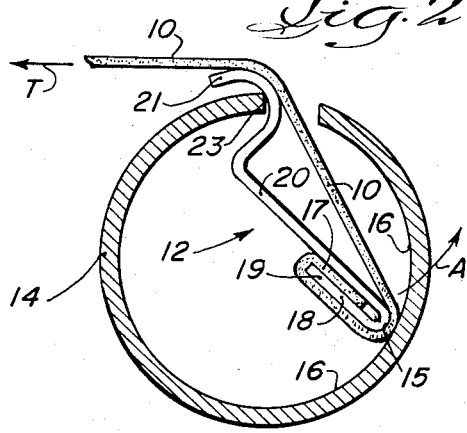
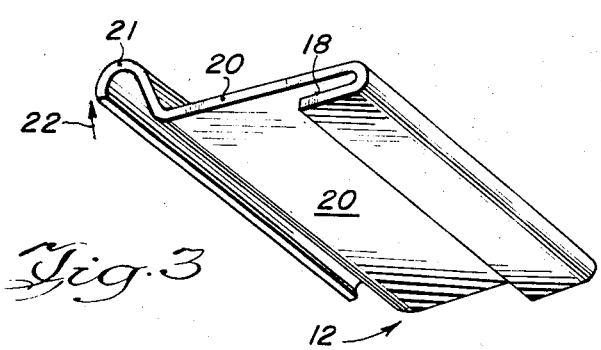
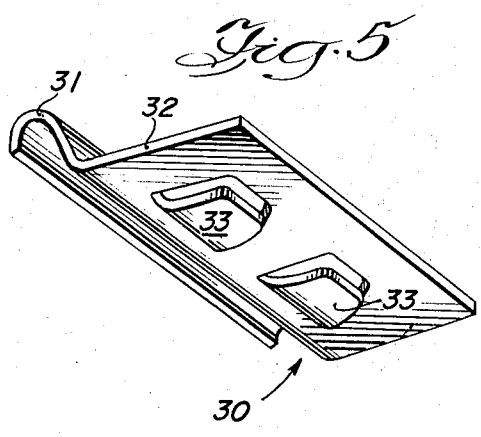
INVENTOR
John W. Sanderson
By Dressler, Goldsmith, Clement, Gordon & Lodd
ATTORNEYS.

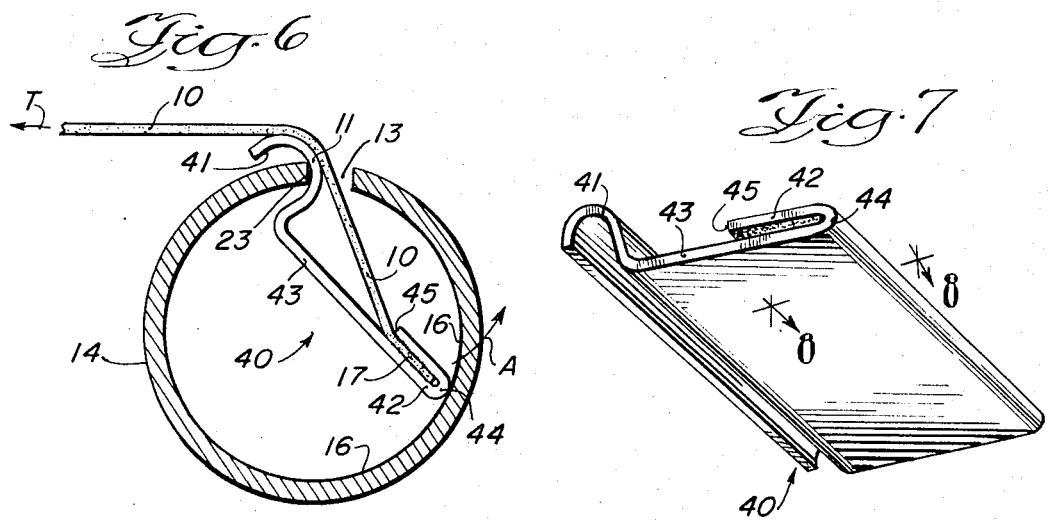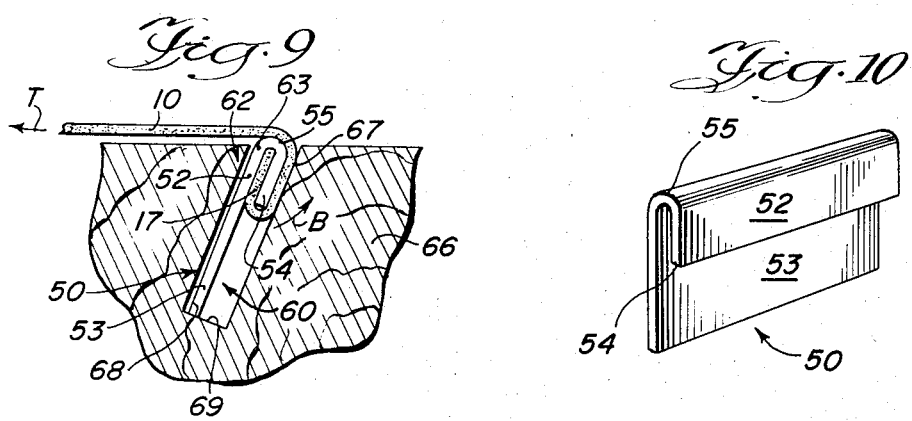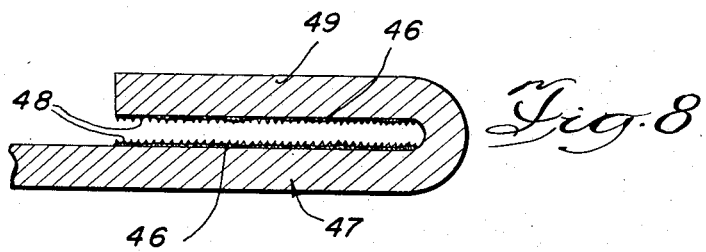

United States Patent Office 3,358,742
Patented Dec. 19, 1967

3,358,742
SECURING DEVICES
John W. Sanderson, Chicago, Ill., assignor to Signode Corporation, a corporation of Delaware
Filed Mar. 1, 1965, Ser. No. 436,140
2 Claims. (Cl. 160—391)

This invention relates to metal anchoring devices secured to the ends of flexible webbing, especially non-metallic straps of the type used in furniture webbing and which enable the strap ends to be securely locked within a receiving slot.

Anchoring devices have been employed in the past to secure webbing within slots of frame elements. However, these devices were constructed in such a manner that the tension forces imposed upon the webbing would tend to pull them out of the anchoring device, thereby loosening the webbing or releasing it from the frame. The present invention is designed to reduce this inadequacy by reducing the transmission of tension forces imposed on the webbing to the joint between the webbing and the anchoring device and also by employing other novel features and actions as described hereinafter. It is also desired to provide structures of greater security, especially against impact forces, and which are designed to facilitate installation in the frame elements.

In accordance with the invention, a strip of flexible webbing extending between a pair of spaced-apart slotted frame elements is secured to these frame elements by metal anchoring devices secured across each of the opposite ends of the webbing and at least partially positioned within each of the slots of the frame elements, the slots being transverse to the longitudinal axis of the webbing. Each of the anchoring devices includes a transverse pivoting portion which engages a portion of the side wall of the slot, which functions as a fulcrum portion, enabling the anchoring device to pivot when tension is applied to the webbing, and a clamping portion to secure the webbing to the anchoring device. This clamping portion is positioned so that the unclamped portion of the webbing immediately adjacent the clamped portion is remote from the slot opening when the anchoring device is installed in the slotted frame element.

The structure is assembled to provide that the tensioned webbing will change direction while passing over and bearing against the anchoring device in the immediate vicinty of the pivoting portion to reduce the transmission of tensile forces to the clamped ends of the webbing.

It is a further aspect of this invention to cause the webbing to change its direction at least twice while in the slot, the second change of direction occurring between the point of securement of the webbing in the clamping portion of the anchoring device and its first change of direction noted hereinbefore, thus to further reduce the transmission of tensile forces imposed on the webbing to the clamped ends thereof.

In accordance with features of the invention, the ends of the webbing are clamped within a U-shaped channel in the anchoring device and the inner surface of the channel has abrasive particles adhered thereto and facilitate a locking engagement between the webbing and the clamping portion of the anchoring device.

As another feature of the invention, the pivoting force imposed on the anchoring device is used to further secure the webbing ends, especially by causing the webbing to become jammed between the anchoring device and the interior of the slot, particularly with a tubular frame element.

With particular regard to tubular frame elements, the invention proposes metal strips formed to include laterally offset hook portions for ease of assembly.

The invention will be more fully described in connection with the accompanying drawings, in which:

FIG. 1 is a perspective view of a chair construction of a tubular frame with webbing secured to the frame to provide a seat for the same;

FIG. 2 is a cross section taken through a tubular frame element and showing a preferred securement of the webbeing end to the tubular frame in accordance with the invention;

FIG. 3 is a perspective view of the anchoring device shown in FIG. 2;

FIG. 4 is similar to FIG. 2 and shows another form of anchoring device in accordance with the invention;

FIG. 5 is a perspective view of the anchoring device shown in FIG. 4;

FIG. 6 is similar to FIG. 2 and shows another form of anchoring device in accordance with the invention;

FIG. 7 is a perspective view of the anchoring device shown in FIG. 6;

FIG. 8 is a fragmentary cross section on the line 8—8 of FIG. 7 and on an enlarged scale to show the clamping portion of a typical anchoring device constructed in accordance with the invention and indicating the preferred use of abrasive in a U-shaped channel clamping portion;

FIG. 9 is a cross section taken through a wooden frame element and showing the securement of the webbing in a slot formed therein; and FIG. 10 is a perspective view of the anchoring device shown in FIG. 9.

FIG. 1 broadly shows the environment of the invention depicting an illustrative utility, e.g., a chair incorporating strips of webbing. As can be seen, the webbing 10 extends between opposed spaced-apart frame elements, such as the tubular frame elements 14, with the opposite ends of the webbing being secured to these frame elements to constitute the seat of a chair. Innumerable other and similar utilities are well known and will be discussed.

The essence of this invention is the securement of the ends of the webbing to the frame elements which, in the invention, is achieved by clamping the ends of the webbing to anchoring devices 12 which are positioned within transverse slots 13 in the frame elements, such as the tubular frame elements 14 shown in FIG. 2.

Referring to FIG. 2, the webbing 10 is secured to a tubular frame element 14 by means of an anchoring device 12 which is inserted into the interior of the tubular frame 14 through the slot 13. It will be observed that the slot extends transversely with respect to the longitudinal axis of the webbing 10.

The anchoring device 12 is more fully seen in the perspective view of FIG. 3 where it will be noted that the anchoring device 12 is formed of a strip of metal having a central body portion 20, a hook portion 21 at one end thereof, and a clamping portion 18 at the other end thereof. The clamping portion 18 is formed by folding an end of the strip of metal over upon itself, as shown, to form a U-shaped channel and the hook portion 21 is shown laterally offset from the body portion 20 with the opening of the hook 21 facing in the same direction as the open end of the clamping portion 18. The lateral offset is noted by arrow 22 and constitutes preferred practice of the invention, but it is not essential to the invention.

Returning to FIG. 2, it will be observed that the end of the webbing 17 is inserted within the U-shaped channel constituting the clamping portion 18 of the anchoring device and is clamped therein. The open end of the U-shaped channel and the unclamped portion of the webbing immediately adjacent thereto are positioned within the frame element remote from the open end of the slot 13. The hook portion 21 of the anchoring device is positioned partly within and partly outside of the slot 13 so that one sidewall of the slot 13 serves as a fulcrum (identified at 23) and an interior portion 11 of the hook 21 serves as a pivoting portion about which the anchoring device can pivot when tension is applied (see arrow T) to the webbing 10.

Following the path of the webbing 10 in FIG. 2, and starting with the clamped end 17, the webbing first turns the end of the metal strip remote from the hook (designated by numeral 19) and which is positioned at the exit of the U-shaped channel clamping portion 18. Then, the webbing turns the end of the anchoring device remote from the hook (identified at 15) and which corresponds to the closed end of the U-shaped clamping portion 18. From the end 15, the webbing passes over the exposed surface of hook 21 and then moves away from the frame element.

When tension, as indicated by arrow T, is applied to the webbing 10, this tension, if transmitted to the end of the webbing, could function to pull the U-shaped clamping portion open to dislodge the clamped end 17 from the anchoring device 12. In the invention the several changes in direction of the tensioned webbing serve to induce frictional resistance and thereby reduce the transmission of these opening forces and, in addition, the sharp bend of the webbing about hook 19 results in the hook biting into the webbing, which further adds to the holding power without weakening the strap. Thus, when the webbing 10 passes over and bears against the exposed surface of hook 21, the end 15 and the corner 19, the tensile force T is reduced and the danger of pulling the webbing end 17 out of the U-shaped clamping channel 18 is correspondingly reduced. The action is similar to the restraining action of a hawser turned around a post on a dock; where, with the aid of a few turns, a lone man can hold a heavy ship.

A jamming action is also achieved to assist the tension reducing function. As tension is applied to the webbing, as indicated, the webbing bears against the exposed surface of the hook, causing the anchoring device to be forced into the slot and also to pivot about the fulcrum portion 22 of the slot 13 (in the direction shown by arrow A). The pivoting action of the anchoring device (and also the inward force noted) causes the end 15 remote from the hook to be forced toward the interior wall 16 of the tubular frame 14, the webbing being jammed between the end 15 of the anchoring device and the interior wall 16. This jamming of the webbing provides a frictional resistance which still further reduces the transmission of tensile forces to the webbing end 17 and serves to further insure the securement of the anchoring device within the tubular frame element.

In the preferred practice of the invention, the webbing is dimensioned so that when the anchoring devices carrying the webbing ends are inserted in the frame slots, the webbing is put in loose and then is subsequently heated, which shrinks the webbing and places it under slight tension, which causes the anchoring devices to be locked in place within the slots.

A further form of securement similar to that shown in FIGS. 2 and 3, but which employs an anchoring device formed of a shorter strip of metal, is shown in FIGS. 4 and 5.

Referring first to FIG. 4, this figure shows a slotted tubular frame element 14, housing an anchoring device 30, to which is secured one end of a strip of webbing 10.

The anchoring device as shown in FIG. 5 consists of a body portion 32, a hook portion 31 at one end thereof and shown laterally offset from the same, and a clamping portion constituted by tines 33 which are pressed from the body portion. The hook portion 31 is the same as the hook portion in FIG. 3, but the tines 33 provide a different securement for the webbing end 17. The webbing end 17 is inserted within the tines 33 constituting the clamping portion of the anchoring device and is clamped therein. The open end of the tines and the unclamped portion of webbing immediately adjacent thereto are positioned within the frame element slot and remote from the open end of the slot 13. The hook portion 31 of the anchoring device is positioned as previously described, with respect to FIG. 2.

Following the path of the webbing 10 in FIG. 4, and starting with the clamped end 17, the webbing first turns the end 34 of the anchoring device remote from the hook 31, and then the webbing passes over an exposed surface of the hook and moves away from the frame element.

The several direction changes of the webbing serve to reduce the transmission of the tension force indicated by arrow T to the clamped end 17, in the same manner as described previously with respect to FIG. 2. Thus, where the webbing 10 passes over and bears against the exposed surface of the hook 31 and turns the end 34 (wherein the end 34 bites into the webbing), the tensile force T is reduced and the danger of pulling the webbing end 17 out of the tines 33 is correspondingly reduced.

A jamming action is again achieved to assist the tension reducing function of the direction changes of the webbing, in the same manner as previously described with respect to FIG. 2.

A still further form of securement similar to that shown in FIGS. 2 and 3 is shown in FIGS. 6 and 7.

Referring first to FIG. 6, this figure shows a slotted tubular frame element 18, housing an anchoring device 40, to which is secured one end of a strip of webbing 10.

The anchoring device as shown in FIG. 7 consists of a body portion 43, a hook portion 31 at one end thereof and shown laterally offset from the same, and a U-shaped channel clamping portion 42 at the other end thereof. The U-shaped channel clamping portion 42 is formed by folding an end of the strip of metal over upon itself, as shown. The hook portion 41 is the same as the hook portion 21 in FIG. 3, but the U-shaped channel clamping portion 42 is folded in the direction of lateral offset, rather than in the direction opposite the lateral offset of the U-shaped clamping portion 18.

The webbing end 17 is inserted within the U-shaped channel 42 constituting a clamping portion of the anchoring device and is clamped therein. The open end of the U-shaped channel and the unclamped portion of the webbing immediately adjacent thereto are positioned within the frame element slot and remote from the open end of the slot 13. The hook portion 41 of the anchoring device 40 is positioned as previously described with respect to FIG. 2.

Following the path of the webbing 10 in FIG. 6, and starting from the clamped end 17, the webbing bends about the end of the metal strip 45 and then passes over the exposed surface of the hook 41 and moves away from the frame element.

The several direction changes of the webbing serve to reduce the transmission of tensile forces to the clamped end 17. In a like manner as discussed with respect to FIG. 2, when the webbing 10 passes over and bears against the exposed surface of hook 41 and bends around the end 45 of the anchoring device 40, the tensile force transmitted to the clamped end 17 is reduced and the danger of pulling the webbing end 17 out of the clamping channel 42 is correspondingly reduced.

A jamming action is caused by the tension force T bearing on the hook 41, causing a pivotal movement which moves the rounded remote end 44 of the anchoring device 40 in the direction shown by arrow A, causing it to be jammed against the interior wall 16 of the tubular frame 14. The result is that the jammed anchoring device is fixed in a position in which it is locked within the frame 14.

FIG. 8 shows the cross section of a typical clamping portion of an anchoring device on an enlarged scale. The clamping portion 47 is formed by folding one end of the body portion 49 over upon itself, forming a U-shaped channel clamping portion as shown, the clamping portion serving to secure the end of a strip of webbing to the anchoring device as previously discussed. To further secure the webbing end, abrasive particles 48 are adhered to the interior surfaces 46 of the clamping portion 47.

The abrasive particles and their securement to the inner surfaces of the U-shaped clamping portion of the anchoring device is more fully discussed in the copending application of Hobart P. Young, Ser. No. 289,081, which issued as Patent No. 3,237,256 on Mar. 1, 1966, the disclosure of which is hereby incorporated by reference.

As previously stated, the essence of the invention is the securement of the ends of webbing to frame elements, which in the invention is achieved by clamping the ends of the webbing to anchoring devices which are positioned within transverse slots in frame elements. The invention includes the use of wooden frame elements, as shown in FIG. 9.

Referring to FIG. 9, the webbing 10 is secured to a wooden frame element 66 by means of an anchoring device 50, which is inserted into the interior of the wooden frame 66 through the slot 60. It will be observed that the slot extends transverse to the longitudinal axis of the webbing 10 and the plane of the slot lies at an acute angle up to about 90° with respect to the plane of the webbing.

The anchoring device 50 is more fully seen in the perspective view of FIG. 10, where it will be noted that the anchoring device 50 is formed of a strip of metal having a body portion 53 and a U-shaped channel clamping portion 52 at one end thereof. The clamping portion 52 is formed by folding one end of the body portion 53 over upon itself as shown.

Returning to FIG. 9, it will be observed that the end of the webbing 17 is inserted within the U-shaped channel clamping portion 52 of the anchoring device 50 and is clamped therein. The open end of the U-shaped channel and an unclamped portion of the webbing immediately adjacent thereto are positioned within the frame element slot 60, remote from the open end thereof. The end of the body portion 68 extends furthest into the slot 60 and rests on the bottom 69 thereof.

The upper portion of one side wall of the slot 60 (designated as 62) in FIG. 9 functions as a fulcrum and the exterior portion of clamping portion 52 which immediately extends from the body portion 53 and immediately adjacent the curved end 55 of the clamping portion 52 serves as a pivoting portion 63 about which the anchoring device pivots when tension is applied to the webbing 10 as indicated by arrow T.

Following the path of the webbing 10 in FIG. 9, and starting from the clamped end 17, the webbing first turns the corner 54, which is positioned at the exit of the U-shaped channel clamping portion 52 and then the webbing proceeds along the exterior surface of the folded leg of the clamping portion 52, between the aforementioned leg and the side wall 67 of the slot, then it turns the curved portion 55 of the U-shaped clamping portion and proceeds to move away from the frame element 66.

When tension, as indicated by arrow T, is applied to the webbing 10, this tension, if transmitted to the end of the webbing 17, could function to pull the U-shaped channel clamping portion 52 open to dislodge the clamped end 17 from the anchoring device 50. In this invention, the several changes of direction of the tensioned webbing serve to induce frictional resistance and thereby reduce the transmission of these opening forces.

Thus, when the webbing 10 passes over and bears against the exposed surface 55 of the clamping portion 52, and the end 54 (wherein the end 54 bites into the webbing), the tensile force T is reduced and the danger of pulling the webbing end 17 out of the U-shaped clamping portion 52 is correspondingly reduced. This is the same action as referred to with respect to FIG. 2.

A jamming action is also achieved to assist the tension reducing function. As tension is applied, as indicated, the webbing 10 bears against the exposed surface of the curved portion 55 of the anchoring device 50, causing the anchoring device to be forced into the slot and also to pivot about the fulcrum portion 62 of the slot 60 in the direction shown by arrow B. The pivoting action of the anchoring device, and also the inward force noted, causes the end 54 of the clamping portion 52 to be forced toward the interior wall 67 of the slot 60, the webbing being jammed between the end 54 and the interior slot wall 67. This jamming of the webbing provides a frictional resistance which still further reduces the transmission of tensile forces to the webbing end 17. The remote end of the body portion 53 is also jammed due to the pivoting action caused by the tension T applied to the webbing 10. The end 53 is jammed against the bottom surface 69 of the slot 60, serving further to insure the securement of the anchoring device 50 within the frame element 66.

As previously indicated, any tensile force applied to the webbing causes the webbing to bear against a protruding portion of the anchoring device to force the same into its anchoring slot. This is of particular importance with respect to impact forces as is noted below.

Thus, and with respect to all of the embodiments which have been discussed hereinbefore, the imposition of a load on the webbing causes the webbing to be drawn taut. It will be particularly noted in FIGS. 2, 4 and 6 that the webbing is free with respect to the exposed surface of the protruding hook portions of the respective anchoring devices so that, as the webbing bears against these hooks, it can slip with respect thereto so that a force tending to insert the anchoring devices into the frame elements in which they are mounted is imposed on the anchoring devices to insure their proper positioning before the imposed force can be transmitted through to the clamped ends of the webbing.

As a result, and in contrast with prior expedients, the forces tending to withdraw the anchoring device from its slot are delayed and do not take place until after the anchoring device has experienced a repositioning force—thus further adding to the security of the structures of the invention. It will be observed that this same delay takes place in the structure of FIG. 9, though not to the same extent because less slippage is permitted, but some slippage is still possible as a result of the fact that the open end of the U-shaped clamping portion is positioned within the slot remote from the open end thereof.

It is to be noted that one type of webbing material that can be used is one made from polypropylene. Other materials can of course be employed. In addition, the securing devices can be provided with a rust resistant coating made with or without particles depending on the conditions desired.

It is, of course, intended to cover by the appended claims all such modifications as fall within the true spirit and scope of the invention.

I claim:

1. In a structure comprising a pair of spaced-apart slotted tubular frame elements and flexible webbing extending between said elements with the opposite ends of said webbing secured in said slots which extend transverse to the longitudinal axis of said webbing, the improvement comprising an anchoring device, which is formed of a strip of metal having a body portion, a hook portion at one end of said body portion, and a U-shaped channel clamping portion at the other end of said body portion, the outer end of which extends toward said hook portion on the side of the body portion that defines the open side of said hook portion, said hook portion being open in a lateral direction in order to engage one side of said slot which functions as a fulcrum so that tension applied to said webbing which passes between the closed end of said U-shaped channel clamping portion and the interior of said tubular frame will cause said anchoring device to pivot about said side of said slot causing said U-shaped channel clamping portion to jam the webbing against the interior of said tubular frame, the unclamped portions of said webbing immediately adjacent the clamped ends of said webbing being positioned within said slots remote from the open end of said slots, said webbing changing its direction while passing over and bearing against the hook portion of said anchoring devices to reduce the transmission of tensile forces imposed on said webbing between said frame elements to the clamped ends thereof.

2. In a structure comprising a pair of spaced-apart slotted tubular frame elements and flexible webbing extending between said elements with the opposite ends of said webbing secured in said slots which extend transverse to the longitudinal axis of said webbing, the improvement comprising an anchoring device which is formed of a strip of metal having a body portion, a hook portion at one end of said body portion and laterally offset from the same, and means for clamping said webbing to the side of said body portion opposite said offset, said hook portion being open in the direction opposite said lateral offset to engage one side of said slot which functions as a fulcrum so that tension applied to said webbing will cause said anchoring device to pivot about said side of said slot, said webbing extending from its clamped end around the end of said body portion remote from said hook and then around said hook so that said webbing will change its direction at least twice with respect to each anchoring device and said webbing will be jammed between the end of said body portion remote from said hook and the interior of said tubular frame when said webbing is tensioned, to reduce the transmission of tensile forces imposed on said webbing to the clamped ends thereof.

References Cited
UNITED STATES PATENTS

| | | | |
|---|---|---|---|
| 885,726 | 4/1908 | Corklin | 160—397 X |
| 2,622,663 | 12/1952 | Burd. | |
| 2,832,399 | 4/1958 | Varkala. | |
| 2,966,206 | 12/1960 | Hartman. | |
| 3,089,233 | 5/1963 | Meier | 24—23 X |
| 3,137,372 | 6/1964 | Nash | 160—392 X |

DAVID J. WILLIAMOWSKY, *Primary Examiner.*

HARRISON R. MOSELEY, *Examiner.*

P. C. KANNAN, *Assistant Examiner.*